(12) United States Patent
Kien et al.

(10) Patent No.: US 7,806,973 B2
(45) Date of Patent: Oct. 5, 2010

(54) COMPOSITIONS FOR IMPARTING IMAGES ON FIBROUS STRUCTURES

(75) Inventors: Kathryn Christian Kien, Cincinnati, OH (US); Jonathan Andrew Ficke, Norwich, NY (US); Gillian Scott Cooper, Leesburg, GA (US); Amy Jo Hamilton, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 474 days.

(21) Appl. No.: 11/804,918

(22) Filed: May 21, 2007

(65) Prior Publication Data

US 2008/0216707 A1     Sep. 11, 2008

Related U.S. Application Data

(60) Provisional application No. 60/904,997, filed on Mar. 5, 2007.

(51) Int. Cl.
*C09D 11/00* (2006.01)
(52) U.S. Cl. .................................. 106/31.75; 106/31.6
(58) Field of Classification Search ............. 106/31.75, 106/31.6
See application file for complete search history.

(56) References Cited

U.S. PATENT DOCUMENTS

| | | | |
|---|---|---|---|
| 2,826,551 A | 3/1958 | Green et al. | |
| 3,301,746 A | 1/1967 | Stanford et al. | |
| 3,825,381 A | 7/1974 | Dunning et al. | |
| 3,949,035 A | 4/1976 | Dunning et al. | |
| 3,964,500 A | 6/1976 | Drakoff | |
| 3,974,025 A | 8/1976 | Ayers | |
| 3,994,771 A | 11/1976 | Morgan, Jr. et al. | |
| 4,100,324 A | 7/1978 | Anderson et al. | |
| 4,163,001 A | 7/1979 | Carumpalos et al. | |
| 4,191,609 A | 3/1980 | Trokhan | |
| 4,300,981 A | 11/1981 | Carstens | |
| 4,364,837 A | 12/1982 | Pader | |
| 4,637,859 A | 1/1987 | Trokhan | |
| 5,059,282 A * | 10/1991 | Ampulski et al. ........... 162/111 |
| 5,529,665 A | 6/1996 | Kaun | |
| 5,552,020 A | 9/1996 | Smith et al. | |
| 6,045,606 A | 4/2000 | Matzinger | |
| 6,477,948 B1 | 11/2002 | Nissing et al. | |
| 6,827,433 B2 * | 12/2004 | Takemoto et al. ........... 347/100 |
| 2005/0257717 A1 * | 11/2005 | Knott et al. ................. 106/499 |

FOREIGN PATENT DOCUMENTS

| | | | |
|---|---|---|---|
| EP | 1 416 020 A | 5/2004 |
| GB | 849433 | 9/1960 |

* cited by examiner

*Primary Examiner*—Jerry Lorengo
*Assistant Examiner*—Veronica Faison Gee
(74) *Attorney, Agent, or Firm*—Peter D. Meyer

(57) ABSTRACT

A composition suitable for printing onto a fibrous structures and/or absorbent paper products is disclosed. The composition is provided with an ink composition and a silicone composition. The ink composition contains from about 0% to about 50% pigment, from about 0% to about 50% resin, and from about 100% to about 0% water. The silicone composition contains from about 1% to about 75% of silicone, from about 99% to about 25% emulsion, and from about 0% to about 99% water. The composition comprises from about 50% to about 99.75% of the ink composition and from about 0.25% to about 50% of the silicone composition.

15 Claims, No Drawings

COMPOSITIONS FOR IMPARTING IMAGES ON FIBROUS STRUCTURES

CROSS-REFERENCE TO RELATED APPLICATION

This application claims the benefit of U.S. Provisional Application No. 60/904,997 filed Mar. 5, 2007.

FIELD OF THE INVENTION

The present invention relates to fibrous structures and/or absorbent paper products having images disposed thereon suitable for use as absorbent disposable paper products. More particularly, the present invention relates to compounds capable of providing such images onto fibrous structures and/or absorbent paper products.

BACKGROUND OF THE INVENTION

The application of images to fibrous structures and/or absorbent paper products by utilizing pigment or dye-based ink compositions is well known in the art. These images are generally applied for the purpose of making the substrate more aesthetically pleasing to the consumer.

One of the difficulties historically associated and experienced with such printed fibrous structures and/or absorbent paper products (for example, absorbent disposable paper products, such as facial tissues, bath tissues, paper towels, table napkins, wipes, diapers, woven disposable fabrics, nonwovens, wovens, cotton pads, and the like) that are printed with such pigment based ink compositions is the tendency for the ink and/or fibers to agglomerate onto the surface of the equipment disposing such ink onto the substrate. The problem is even more pronounced for those fibrous structures and/or absorbent paper products printed with inks having lint content.

Such issues regarding printing process equipment hygiene can be considered a significant drawback associated with the use of such inks. Inks that adhere well to a fibrous structure and/or absorbent paper product often exhibit similar properties when in contact with the printing process equipment. For example, print plates tend to accumulate ink and/or fiber deposits that can eventually lead to print defects in the printed substrate.

In order to prevent such print defects, it is often necessary to provide for frequent cleaning of the printing process equipment. Naturally, this can lead to reduced printing process efficiency and increased costs associated with the installation and maintenance of such printing process cleaning equipment.

Thus, it would be clearly desirable to provide for a pigment or dye-based ink composition that is disposable onto a fibrous structure and/or absorbent paper product that has a reduced tendency to agglomerate with or without fibers onto the printing process equipment surfaces causing the printing press hygiene issues described supra. Likewise, the use of such pigments or dye-based ink compositions, as described herein, can reduce the need for extensive printing press cleaning equipment and reduced labor while providing for high quality images onto the resulting substrate.

SUMMARY OF THE INVENTION

The present invention provides a composition suitable for printing onto a fibrous substrate. The composition comprises an ink composition comprising from about 0% to about 50% pigment, from about 0% to about 50% resin, and from about 100% to about 0% water. The composition also comprises a silicone composition comprising from about 1% to about 75% of silicone, from about 99% to about 25% emulsion, and from about 0% to about 99% water. The composition comprises from about 50% to about 99.3% of the ink composition and from about 0.7% to about 50% of said silicone composition.

The present invention also provides a composition suitable for printing onto a fibrous substrate. The composition comprises about 50% to about 99.75% of an ink composition and from about 0.25% to about 50% of a silicone composition. The composition provides an increase in the number of print element impressions between observed print defects value of at least about 127%.

The present invention also provides a composition suitable for printing onto a fiber substrate. The composition comprises an ink composition comprising from about 0% to about 50% pigment, from about 0% to about 50% resin, and from about 100% to about 0% water, a silicone composition comprising from about 1% to about 75% silicone, and from about 1% to about 50% emulsion, and from about 0% to about 99% water. The composition comprises from about 50% to about 99.75% of said ink composition and from about 0.25% to about 50% of said silicone composition. The silicone composition is applied to the fiber substrate at a rate of at least about $7.0 \times 10^{-5}$ g/m$^2$.

DETAILED DESCRIPTION OF THE INVENTION

In order to enhance the aesthetics of fibrous structures and/or absorbent paper products, it can be desirable to use pigment or dye-based inks. It is also desirable to provide a pigment or dye-based ink composition (hereinafter "inks") that does not have a tendency to agglomerate with or without fibers onto any processing equipment, yet maintains a stable image when deposited upon an absorbent disposable paper product. One of skill in the art would understand such agglomerations to be the root cause of so-called print defects.

A 'print defect' is defined as a spot within a print that is a well defined area of color that is in sharp contrast to the intended color of the print element. Without desiring to be bound by theory, it is believed that such 'print defects' are normally caused by fiber and ink building up between process printing dots or fiber and ink sticking to or next to the printing element surface. This build-up can be considered to act as a sort of 'sponge' to pick-up ink and apply more ink than intended to the fibrous structure and/or absorbent paper product in the print area. By way of non-limiting example, a print defect would be observed as a bright magenta or purple spot in the middle of blue flower petal in a multi-color print process. Another non-limiting example of a print defect in a single color line printing process could be observed as a bright magenta spot in the middle of a pale pink flower petal. Such a spot having an area of less than 2 mm$^2$ would be considered a defect. Such a spot can comprise any shape.

As would be known to one of skill in the art, fibrous structures and/or absorbent paper products can be provided as fibrous structures comprising one or more fibers. Non-limiting examples of processes for making fibrous structures and/or absorbent paper products include known wet plate papermaking processes and air-laid papermaking processes. Such processes typically include the steps of preparing a fiber composition in the form of a suspension in a medium, either wet (also known as an aqueous medium) or dry (also known as a gaseous or air medium). The aqueous medium used for wet-laid processes is oftentimes referred to as a fiber slurry. The fiber suspension is then used to deposit a plurality of fibers onto a forming wire or belt such that an embryonic fibrous structure is formed, after which drying and/or bonding the fibers together results in a fibrous structure. Further processing of the fibrous structure may be carried out such that a finished fibrous structure is formed. A non-limiting example, as is known in a typical papermaking process, the finished fibrous structure and/or absorbent paper product is the fibrous structure that is wound on the reel at the end of the papermaking process. The wound fibrous structure may subsequently be converted into a finished product, such as an absorbent paper product, for example paper toweling, facial tissues, and/.or bath tissues.

Fibers suitable for use in producing such fibrous structures and/or absorbent paper products have elongate physical structures having an apparent length that greatly exceeds its apparent diameter. Fibers having a non-circular cross section and/or tubular shape are common. The diameter of such fibers may be considered to be the diameter of a circle having a cross-sectional area equal to the cross-sectional area of the respective fiber.

The present invention contemplates the use of a variety of fibrous structure-making fibers that include natural fibers, synthetic fibers, or any other fibers suitable for producing sanitary tissue products, as well as combinations thereof.

Natural fibrous structure-making fibers useful for the production of articles incorporating the present invention include animal fibers, mineral fibers, and plant fibers. Animal fibers may, for example, be selected from the group consisting of wool, silk, and combinations thereof. Plant fibers may include cellulosic fibers derived from a plant selected from the group consisting of wood, cotton, cotton linters, flax, sisal, abaca, hemp, hesperaloe, jute, bamboo, bagasse, kudzu, corn, sorghum, gourd, agave, loofah, and combinations thereof.

Cellulose fibers are quite suitable since they may form hydrogen bonds owing to their alcohol functional groups. Such cellulose fibers may also form ionic bonds through their carboxylic acid functionalities. Additionally, covalent bonds may be formed by taking advantage of the reactivity of either the alcohol or acid moieties.

Of the cellulose fibers, wood fibers (often referred to as wood pulps) are preferred. Such fibers can include chemical pulps, such as Kraft (sulfate) and sulfite pulps, as well as mechanical and semi-chemical pulps, including, for example, ground wood, thermomechanical pulp, chemimechanical pulp (CMP), chemithermomechanical pulp (CTMP), neutral semi-chemical sulfite pulp (NSCS). Chemical pulps, however, may be preferred since they impart a superior tactile sense of softness to tissue sheets made therefrom. Pulps derived from both deciduous trees (also known as hardwoods) and coniferous trees (also known as softwoods) may be utilized. Hardwood and softwood fibers can be blended or, in the alternative, deposited in layers to provide a stratified and/or layered web. Such layered hardwood and softwood fibers are described in U.S. Pat. Nos. 4,300,981 and 3,994,771. Additionally, fibers derived from recycled paper, which may contain any or all of the above categories as well as other non-fibrous material (such as fillers and adhesives used to facilitate the original papermaking process), may be used.

Wood pulp fiber suitable for use for the present invention may be short (typical of hardwood fibers) or long (typical of softwood fibers). Non-limiting examples of short fibers include fibers derived from a fiber source selected from the group consisting of acacia, eucalyptus, maple, oak, aspen, birch, cottonwood, alder, ash, cherry, elm, hickory, poplar, gum, walnut, locust, sycamore, beech, catalpa, sassafras, gmelina, albizia, anthocephalus, and magnolia. Non-limiting examples of long fibers include fibers derived from pine, spruce, fir, tamarack, hemlock, cyprus, and cedar. Softwood fibers derived from the Kraft process and originating from more northern climates may be preferred. These are often referred to as Northern Softwood Kraft (NSK) pulps.

Synthetic fibers are also suitable and may be selected from the group consisting of wet spun fibers, dry spun fibers, melt spun (including melt blown) fibers, synthetic pulp fibers, and combinations thereof. Synthetic fibers may, for example, comprise cellulose (often referred to as rayon), cellulose derivatives (such as esters, ether, or nitrous derivatives), polyolefins (including polyethylene, and polypropylene), polyesters (including polyethylene terephthalate, polyamides (nylon), acrylics, non-cellulosic polymeric carbohydrates (starch, starch derivatives, chitin, chitin derivatives, and chitosan), and combinations thereof.

Fibrous structures and/or absorbent paper products produced by such fibers (the web) of the present invention may comprise fibers, films, and/or foams that comprise a hydroxyl polymer and optionally a cross-linking system. Non-limiting examples of suitable hydroxyl polymers include polyols (such as polyvinyl alcohol, polyvinyl alcohol derivatives, polyvinyl alcohol copolymers), starch, starch derivatives, chitosan, chitosan derivatives, cellulose derivatives (such as cellulose, ether and ester derivatives), gums, arabinans, galactans, proteins, and various other polysaccharides, and mixtures thereof. For example, a web of the present invention may comprise a continuous, or substantially continuous, fiber comprising a starch, hydroxyl polymer and a polyvinyl alcohol hydroxyl polymer that is produced by dry spinning and/or solvent spinning a composition comprising the starch hydroxyl polymer and the polyvinyl alcohol hydroxyl polymer.

Fibrous Structures and/or Absorbent Paper Products

Non-limiting examples of fibrous structures and/or absorbent paper products suitable for use with the present invention comprise fibers having at least one bonding moiety selected from the group consisting of bonding moieties capable of forming hydrogen bonds, bonding moieties capable of forming ionic bonds, bonding moieties capable of forming covalent bonds, and combinations thereof.

Non-limiting types of fibrous structures and/or absorbent paper products include conventionally felt pressed fibrous structures, pattern densified fibrous structures, and high bulk, uncompacted fibrous structures. The fibrous structures and/or absorbent paper products may be of a homogeneous or multi-layered (i.e., comprising two or more layers) construction, and the resulting absorbent paper products made therefrom may be of a single ply or multi-ply construction.

The fibrous structures and/or sanitary tissue products of the present invention may exhibit a basis weight of between 10 g/m$^2$ to about 120 g/m$^2$ and/or from about 14 g/m$^2$ to about 80 g/m$^2$ and/or from about 20 g/m$^2$ to about 60 g/m$^2$.

The fibrous structures and/or absorbent paper sanitary tissue products of the present invention may exhibit a total dry tensile strength (i.e., the sum of machine direction and cross-machine direction) of greater than about 59 g/cm (150 g/in) and/or from about 78 g/cm (200 g/in) to about 394 g/cm (1000 g/in) and/or from about 98 g/cm (250 g/in) to about 335 g/cm (850 g/in). In addition, the sanitary tissue product of the present invention may exhibit a total dry tensile strength of greater than about 196 g/cm (500 g/in) and/or from about 196 g/cm (500 g/in) to about 394 g/cm (1000 g/in) and/or from about 216 g/cm (550 g/in) to about 335 g/cm (850 g/in) and/or from about 236 g/cm (600 g/in) to about 315 g/cm (800 g/in).

In another example, the fibrous structures and/or absorbent paper sanitary tissue products of the present invention may exhibit a total dry tensile strength of greater than about 315 g/cm (800 g/in) and/or greater than about 354 g/cm (900 g/in) and/or greater than about 394 g/cm (1000 g/in) and/or from about 315 g/cm (800 g/in) to about 1968 g/cm (5000 g/in) and/or from about 354 g/cm (900 g/in) to about 1181 g/cm (3000 g/in) and/or from about 354 g/cm (900 g/in) to about 984 g/cm (2500 g/in) and/or from about 394 g/cm (1000 g/in) to about 787 g/cm (2000 g/in).

The fibrous structures and/or absorbent paper products of the present may exhibit a density of less than about 0.60 g/cm$^3$ and or less than about 0.30 g/cm$^3$ and/or less than about 0.20 g/cm$^3$ and or less than about 0.01 g/cm$^3$ and/or less than about 0.07 g/cm³ and/or less than about 0.05 g/cm³ and/or from about 0.01 g/cm³ to about 0.20 g/cm³ and/or from about 0.02 g/cm³ to about 0.10 g/cm³.

In one example, the fibrous structures and/or absorbent paper products of the present invention is a patterned densified fibrous structure characterized by having a relatively high bulk region of relatively low fiber density and an array of densified regions of relatively high fiber density. The high bulk field is characterized as a field of pillow regions. The densified zones are referred to as knuckle regions. The knuckle regions exhibit greater density than the pillow regions. The densified zones may be discretely spaced within the high bulk field or may be interconnected, either fully or partially, within the high bulk field. Typically from about 8% to about 65% of the fibrous structure surface comprises densified knuckles. The knuckles may exhibit a relative density of at least 125% of the density of the high bulk field. Processes for making such pattern densified fibrous structures are known in the art and are exemplified in U.S. Pat. Nos. 3,301,746; 3,974,025; 4,191,609; and 4,637,859.

Fibrous structures and/or absorbent paper products suitable for use with the present invention may be in the form of through-air-dried fibrous structures, differential density fibrous structures, differential basis weight fibrous structures, wet-laid fibrous structures, air-laid fibrous structures, conventional dried fibrous structures, creped or uncreped fibrous structures, pattern densified or non-patterned densified fibrous structures, compacted or uncompacted fibrous structures, non-woven fibrous structures comprising synthetic or multi-component fibers, homogeneous or multi-layered fibrous structures, double re-creped fibrous structures, foreshortened fibrous structures, co-formed fibrous structures, and combinations thereof. Air-laid fibrous structures may be formed by the use of thermal bonded air-laid fibrous structures, latex bonded air-laid fibrous structures, and mixed bonded air-laid fibrous structures. Exemplary structures are described in U.S. Pat. Nos. 3,949,035; 3,825,381; and 4,100,324.

Any fibrous structures and/or absorbent paper products produced in accordance with the present invention may comprise additives such as bulk softening agents, other softening additives, solid additives (such as starch and clays), dry-strength resins and wetting agents, lint resisting agents, absorbency enhancing agents, immobilizing agents, emollients, lotions, and other softening compositions, anti-viral agents, anti-bacterial agents, and combinations thereof, as would be known to one of skill in the art. These additives, as well as other additives, may be added to the fiber furnish, the embryonic fibrous web, and/or the fibrous structure resulting therefrom.

Ink Composition

The ink composition of the present invention is preferably a liquid composition that may be applied onto a fibrous structure and/or absorbent paper product in a predetermined pattern. Suitable components of an ink composition may include, but are not limited to, a vehicle such as a solvent or water, a colorant such as a pigment or dye, a binder, and other components that may include, but are not limited to, wax, cross-linking agents, fixatives, pH control agents, viscosity modifiers, defoamers, dispersants, preservatives, and corrosion control agents.

Such inks are preferably any composition or components thereof applied to a substrate (such as the fibrous structures and/or absorbent paper products described herein) that remain thereon in a visible pattern, even though the components of the ink may evaporate. The components of the ink composition may be applied to the fibrous structure and/or absorbent paper product sequentially or as a mixture. The vehicle of the ink composition is the liquid component utilized to convey the ink composition to the surface of the substrate. The pigment is the insoluble color matter used in a finely divided, dispersed form to impart color to the ink. Dyes are colorants that are soluble in a continuous phase of the ink. Binders are adhesive components of ink compositions used to provide bonding between the ink and the substrate, such as a fibrous structure.

Suitable ink compositions of the present invention include, but are not limited to, ink compositions that are in the form of a liquid at room temperature. Preferred embodiments of the ink compositions utilize water as a vehicle and pigment as a colorant. As detailed, supra, a binder can be used to adhere the ink to the surface of a substrate. In general, rub-off resistance of the ink composition increases as adherence of the ink to the surface of the substrate increases. Ink compositions that include binders comprised of film forming polymers tend to have improved adherence of the ink to the surface of the substrate in comparison to inks containing non-film forming binders.

Cross-linking agents are generally added to a finished ink composition or to a pigment dispersion. An ink composition that contains the key components, such as a vehicle, pigment, and binder so as to render the ink composition ready for use, is known to those of skill in the art as a "finished ink composition". A composition comprising pigment solids, surfactants, and a vehicle such as water or oil to which a binder is added is known to those of skill in the art as a pigment dispersion. Cross-linking agents are believed to enhance the rub-off resistance of the ink by cross-linking with the ink. Glycerin or other humectants may also be added to the ink composition of the present invention in order to improve ink rub-off resistance, process efficiency, or process reliability.

In a preferred embodiment of the present invention, water based flexography ink suitable for use with the present invention include pigments present in a weight percent ranging from about 0% to about 50%, or about 14%; resin ranging from about 0% to about 50%, or about 12%; and water ranging from about 100% to about 0%, or about 74%.

Silicone Composition

It was surprisingly found that the addition of silicone based materials to the ink composition prevented and/or delayed the build-up of fiber and ink on the flexographic printing equipment surfaces (e.g., flexographic printing plates). It is generally known that processes using flexographic printing for fibrous substrates having a high lint content can cause the agglomeration of the loose into fibers into the ink composition, thereby causing the agglomerated mass of ink and lint onto the surfaces of the printing equipment. Such agglomerations cause the aforementioned problems as described supra.

It was found that the incorporation of a water miscible emulsion comprising silicone into the ink composition was an effective deterrent to this agglomeration process. Suitable silicone products may comprise silicone materials, such as polysiloxane compounds, cationic silicones, quaternary silicone compounds, and/or amino silicones. In general, suitable polysiloxane materials suitable for use with the present invention include those having monomeric siloxane units of the following structure:

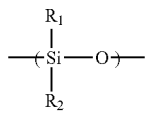

As preferred herein, $R_1$ and $R_2$ for each independent siloxane monomeric unit can each independently be hydrogen or any alkyl, aryl, alkenyl, alkaryl, arakyl, cycloalkyl, halogenated hydrocarbon, or other radical, or combinations thereof. Any of such radicals can be substituted or unsubstituted. $R_1$ and $R_2$ radicals of any particular monomeric unit may differ from the corresponding functionalities of the next adjoining monomeric unit. Additionally, the polysiloxane can be either a straight chain, a branched chain, or have a cyclic structure. The radicals $R_1$ and $R_2$ can additionally independently be other silaceous functionalities, such as, but not limited to, siloxanes, polysiloxanes, silanes, and polysilanes. The radicals $R_1$ and $R_2$ may contain any of a variety of organic functionalities including, by way of non-limiting example, alcohol, carboxylic acid, phenyl, and amine functionalities.

Exemplary alkyl radicals are methyl, ethyl, propyl, butyl, pentyl, hexyl, octyl, decyl, octadectyl, and the like. Exemplary alkenyl radicals are vinyl, allyl, and the like. Exemplary aryl radicals are phenyl, diphenyl, napthyl, and the like. Exemplary alkaryl radicals are toyl, xylyl, ethylphenyl, and the like. Exemplary arakyl radicals are benzyl, alpha-phenylethyl, beta-phenylethyl, alpha-phenylbutyl, and the like. Exemplary cycloalkyl radicals are cyclobutyl, cyclopentyl, cyclohexyl, and the like. Exemplary halogenated hydrocarbon radicals are chlorolmethyl, bromoethyl, tetrafluoroethyl, fluoroethyl, trifluoroethyl, trifluorotloyl, hexafluoroxylyl, and the like.

In another non-limiting embodiment, suitable polysiloxanes include straight chain organopolysiloxane materials of the following general formula:

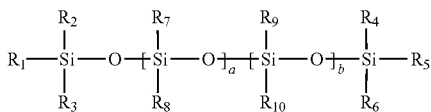

In the above exemplary organopolysiloxane, each of the $R_1$ through $R_9$ radicals can independently be any $C_1$ through $C_{10}$ unsubstituted alkyl or aryl radical and $R_{10}$ of any substituted $C_1$ through $C_{10}$ alkyl or aryl radical. In one example, each $R_1$ through $R_9$ radical is independently any $C_1$ through $C_4$ unsubstituted alkyl group. Those skilled in the art will recognize that technically there is no difference whether, for example, $R_9$ or $R_{10}$ is the substituted radical. In yet another non-limiting example, the mole ratio of b to (a+b) is between 0% and about 20% and/or between 0% and about 10% and/or between about 1% and about 5%.

In yet another non-limiting embodiment, $R_1$ through $R_9$ are methyl groups and $R_{10}$ is a substituted or unsubstituted alkyl, aryl, or alkenyl group. Such a material would be generally known to those of skill in the art as a polydimethylsiloxane which has a particular functionality as may be appropriate in that particular case. Exemplary, but non-limiting, polydimethylsiloxanes include a polydimethylsiloxane having an alkyl hydrocarbon $R_{10}$ radical and polydimethylsiloxane having one or more amino carboxyl, hydroxyl, ether, polyether, aldehyde, ketone amide, ester, thyol, and/or other functionalities, including alkyl and alkenyl analogues of such functionalities. By way of non-limiting example, an amino functional alkyl group, such as $R_{10}$, could be an amino functional or an amino alkyl functional polydimethylsiloxane. It should be noted that the exemplary listing of these polydimethylsiloxanes is not meant to thereby exclude others not specifically identified herein. Exemplary and suitable polysiloxanes are described in U.S. Pat. Nos. 2,826,551; 3,964,500; 4,364,837; 5,059,282; 5,529,665; 5,552,020; and GB Patent No. 849,433. It should be recognized by those of skill in the art that extensive listing and descriptions of polysiloxanes suitable for use with the present invention are commercially available as required.

In a preferred embodiment, such a silicone suitable for use for incorporation into the ink composition described herein is provided as a water miscible emulsion. In a preferred embodiment, the silicone suitable for incorporation into the silicone composition is present in a weight percent ranging from about 1% to about 75%, more preferably about 34%; emulsion is present in a weight percent ranging from about 1% to about 50%, more preferably about 20%; and water is present in a weight percent ranging from about 0% to about 99%, more preferably about 44%.

In yet another embodiment of the present invention, the combination of the ink composition and silicone composition is provided as a weight percent ranging from about 50% to about 99.75% of ink, or about 98% ink, and from about 0.25% to about 50%, or from about 0.5% to about 10%, or from about 1.0% to about 5.0%, or from about 2.0% of silicone composition. However, one of skill in the art would readily understand that the presence of about 0.25% silicone composition and about 99.75% ink composition can provide for a satisfactory process that provides the benefits described supra. In any regard, the precise amounts of ink composition and silicone composition are preferably provided in amounts to provide for the benefits anticipated and discussed herein.

In a preferred embodiment of the present invention, the application rate of the combined ink silicone composition is presented onto the desired fibrous structure and/or absorbent paper product in order to provide for both the transfer of a desirable image and also provide for the reduction of lint in such substrates as well as the agglomeration of ink/silicone/lint morass onto the surfaces of the printing equipment. In a preferred embodiment of the present invention, the ink/silicone composition is provided to a low density tissue product and a high density towel product at the rates presented in Table 1. As shown in Tables 1 and 2, one of skill in the art would understand the exemplary application rates (i.e., ink usage) to various exemplary fibrous structures and/or absorbent paper products (i.e., tissue substrates such as bath and facial tissue, towel substrates such as paper toweling) are applied at various exemplary levels (i.e., percent print coverage—1%, 5%, 50%, 100%) to a fibrous substrate at the levels of silicone composition present in the ink/silicone composition of 0.25%, 0.5%, 1%, 2%, 5%, 10% and 50%.

TABLE 1

Application Rates of Exemplary Silicone Component of Ink/Silicone
Compositions to Fibrous Substrates Using Typical Towel Substrate Coat Rate

| | % Silicone in Ink | | | | | | |
|---|---|---|---|---|---|---|---|
| | 0.25 | 0.5 | 1.0 | 2.0 | 5.0 | 10 | 50 |
| 1% sheet print coverage coat rate, $g/m^2 \times 10^{-2}$ | 0.031 | 0.061 | 0.12 | 0.25 | 0.61 | 1.2 | 6.1 |
| 5% sheet print coverage coat rate, $g/m^2 \times 10^{-2}$ | 0.15 | 0.31 | 0.61 | 1.2 | 3.1 | 6.1 | 31 |
| 50% sheet print coverage coat rate, $g/m^2 \times 10^{-2}$ | 1.54 | 3.1 | 6.1 | 12 | 31 | 61 | 310 |
| 100% sheet print coverage coat rate, $g/m^2 \times 10^{-2}$ | 3.1 | 6.1 | 12 | 25 | 61 | 120 | 610 |

TABLE 2

Application Rates of Exemplary Silicone Component of Ink/Silicone
Compositions to Fibrous Substrates Using Typical Tissue Substrate Coat Rate

| | % Silicone in Ink | | | | | | |
|---|---|---|---|---|---|---|---|
| | 0.25 | 0.5 | 1.0 | 2.0 | 5.0 | 10 | 50 |
| 1% sheet print coverage coat rate, $g/m^2 \times 10^{-2}$ | 0.007 | 0.014 | 0.029 | 0.058 | 0.14 | 0.29 | 1.4 |
| 5% sheet print coverage coat rate, $g/m^2 \times 10^{-2}$ | 0.036 | 0.072 | 0.14 | 0.29 | 0.72 | 1.4 | 7.2 |
| 50% sheet print coverage coat rate, $g/m^2 \times 10^{-2}$ | 0.36 | 0.72 | 1.44 | 2.9 | 7.2 | 14 | 72. |
| 100% sheet print coverage coat rate, $g/m^2 \times 10^{-2}$ | 0.72 | 1.4 | 2.9 | 5.8 | 14 | 29 | 144 |

Applying Exemplary Ink/Silicone Compositions to Fibrous Structures and/or Absorbent Paper Products The ink/silicone composition can be used in conjunction with any type of printing application, including, but not limited to, ink jet, rotogravure, letterpress, intaglio, lithography, silk screen, and most preferably flexography. Also, if desired, a print enhancing fluid can be applied prior to one or more of the print stations. Such print enhancing fluids are described in U.S. Pat. No. 6,477,948 B1.

The ink/silicone composition may be applied to the fibrous structure and/or absorbent paper product directly or indirectly in any number of ways, including, but not limited to, dipping the substrate in a solution of the ink/silicone composition, spraying a solution of the ink/silicone composition onto the substrate, or preferably by printing the ink silicone composition onto the fibrous structure and/or absorbent paper product. If required, a print enhancing fluid may be applied to the substrate in a like manner.

A single color image or multi-color image may be applied to the fibrous structure and/or absorbent paper product. Devices suitable for applying an image onto a fibrous structure and/or absorbent paper product, such as an absorbent paper product in accordance with the present invention, are described in U.S. Pat. No. 6,477,948 B1. It was surprisingly found that the present invention can provide for a marked decrease in print defects within a defined and measured area of a substrate. As shown in Table 3, as the concentration of silicone present in an exemplary ink composition was increased, the number of printing element impressions completed between observed print defects increased. The observed increase in this measure of overall print quality was surprising as the addition of even small quantities of silicone composition to the ink composition were capable of more than doubling the amount of available impressions made to the substrate between observed print defects.

It is noted that terms like "specifically," "preferably," "typically", "generally", and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

The dimensions and/or values disclosed herein are not to be understood as being strictly limited to the exact dimension and/or numerical value recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition suitable for printing onto a fibrous substrate, the composition comprising:

an ink composition comprising from about 0% to about 50% pigment, from about 0% to about 50% resin, and from about 100% to about 0% water;

a silicone composition comprising from about 1% to about 75% of silicone, from about 1% to about 50% emulsion, and from about 0% to about 99% water;

TABLE 3

Impression Rate Defect

| | % Silicone in ink | | | | | | | |
|---|---|---|---|---|---|---|---|---|
| | 0 | 0.25 | 0.5 | 1 | 2 | 5 | 10 | 50 |
| # of print element impressions between observed print defects | 1083 | 2459 | 3834 | 4667 | 6334 | 11334 | 19668 | 86340 |
| % increase in number of print element impressions between observed print defects | — | 127 | 254 | 331 | 485 | 946 | 1715 | 7869 | wherein said silicone is a polysiloxane having the general formula:

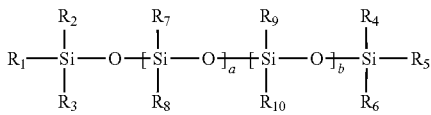

wherein,
  each of $R_1$ through $R_9$ is a $C_1$ through $C_{10}$ unsubstituted alkyl radical, and,
  $R_{10}$ is a $C_1$ through $C_{10}$ alkyl, alkenyl, or amino radical; and,
  the mole ratio of b to (a+b) ranges from about 0% to about 20%; and,
  wherein said composition comprises from about 50% to about 99.75% of said ink composition and from about 0.25% to about 50% of said silicone composition.

2. The composition of claim 1, wherein said composition comprises from about 0.50% to about 10% of said silicone composition.

3. The composition of claim 2, wherein said composition comprises from about 1.0% to about 5.0% of said silicone composition.

4. The composition of claim 3, wherein said composition comprises about 2.0% of said silicone composition.

5. The composition of claim 1, wherein said composition comprises about 98% of said ink composition.

6. The composition of claim 1, wherein $R_1$ through $R_9$ are methyl groups.

7. The composition of claim 6, wherein $R_{10}$ is an amino functional polydimethylsiloxane.

8. The composition of claim 1, wherein said silicone is present in a weight percent of about 34%.

9. The composition of claim 1, wherein said emulsion is present in a weight percent of about 20%.

10. A composition suitable for printing onto a fiber substrate, the composition comprising:
  about 50% to about 99.75% of an ink composition;
  from about 0.25% to about 50% of a silicone composition wherein said silicone is a polysiloxane having the general formula:

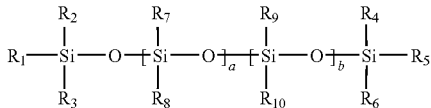

wherein,
  each of $R_1$ through $R_9$ is a $C_1$ through $C_{10}$ unsubstituted alkyl radical, and,
  $R_{10}$ is a $C_1$ through $C_{10}$ alkyl, alkenyl, or amino radical; and,
  the mole ratio of b to (a+b) ranges from about 0% to about 20%; and,
  wherein said composition provides an increase in number of print element impressions between observed print defects value of at least about 127%.

11. The composition of claim 10, wherein said composition provides an increase in number of print element impressions between observed print defects value of at least about 254%.

12. The composition of claim 11, wherein said composition provides an increase in number of print element impressions between observed print defects value of at least about 331%.

13. A composition suitable for printing onto a fiber substrate, the composition comprising:
  an ink composition comprising from about 0% to about 50% pigment, from about 0% to about 50% resin, and from about 100% to about 0% water;
  a silicone composition comprising from about 1% to about 75% silicone, from about 1% to about 50% emulsion, and from about 0% to about 99% water, wherein said silicone is a polysiloxane having the general formula:

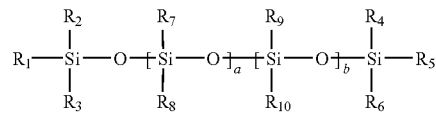

wherein,
  each of $R_1$ through $R_9$ is a $C_1$ through $C_{10}$ unsubstituted alkyl radical, and,
  $R_{10}$ is a $C_1$ through $C_{10}$ alkyl, alkenyl, or amino radical; and,
  the mole ratio of b to (a+b) ranges from about 0% to about 20%; and,
  wherein said composition comprises from about 50% to about 99.75% of said ink composition and from about 0.25% to about 50% of said silicone composition; and,
  wherein said silicone composition is applied to said fiber substrate at a rate of at least about $7.0 \times 10^{-5}$ g/m$^2$.

14. The composition of claim 13, wherein said silicone composition is applied to said fiber substrate at a rate of at least about $2.88 \times 10^{-3}$ g/m$^2$.

15. The composition of claim 14, wherein said silicone composition is applied to said fiber substrate at a rate of at least about $7.2 \times 10^{-3}$ g/m$^2$.

* * * * *